(12) United States Patent
Kim et al.

(10) Patent No.: US 9,318,766 B2
(45) Date of Patent: Apr. 19, 2016

(54) TECHNIQUE FOR DESIGNING AND MANUFACTURING SOLID OXIDE FUEL CELL HAVING IMPROVED OUTPUT CAPABILITY IN MID TO LOW TEMPERATURE

(71) Applicant: Korea Institute of Industrial Technology, Cheonan-si (KR)

(72) Inventors: Ho Sung Kim, Suwon-si (KR); Ju Hee Kang, Gwangju-si (KR); Hyo Sin Kim, Seoul (KR); Jin Hun Jo, Hwaseong-si (KR); Yeong Mok Kim, Daegu-si (KR); Sang Hun Heo, Changwon-si (KR); Tae Won Kim, Gwangju (KR)

(73) Assignee: Korea Institute of Industrial Technology, Cheonan-Si (KR)

( * ) Notice: Subject to any disclaimer, the term of this patent is extended or adjusted under 35 U.S.C. 154(b) by 97 days.

(21) Appl. No.: 14/377,109

(22) PCT Filed: Nov. 20, 2012

(86) PCT No.: PCT/KR2012/009812
§ 371 (c)(1),
(2) Date: Aug. 6, 2014

(87) PCT Pub. No.: WO2013/129757
PCT Pub. Date: Sep. 6, 2013

(65) Prior Publication Data
US 2015/0004526 A1    Jan. 1, 2015

(30) Foreign Application Priority Data
Feb. 27, 2012 (KR) .......... 10-2012-0019682

(51) Int. Cl.
H01M 8/12    (2006.01)
H01M 4/88    (2006.01)
H01M 4/90    (2006.01)

(52) U.S. Cl.
CPC .......... *H01M 8/1253* (2013.01); *H01M 4/8803* (2013.01); *H01M 4/8835* (2013.01);
(Continued)

(58) Field of Classification Search
None
See application file for complete search history.

(56) References Cited

U.S. PATENT DOCUMENTS

2009/0136821 A1* 5/2009 Gottmann .......... H01M 4/8885
429/405

FOREIGN PATENT DOCUMENTS

JP    H03114291 A    5/1991
JP    05-294629      11/1993
(Continued)

OTHER PUBLICATIONS

Jung et al. Journal of The Electrochemical Society 154, 5, B480-B485 (2007).*

(Continued)

*Primary Examiner* — Carlos Barcena
*Assistant Examiner* — Wojciech Haske
(74) *Attorney, Agent, or Firm* — Warn Partners, P.C.

(57) ABSTRACT

The present invention relates to a technique for manufacturing a unit cell for a solid oxide fuel cell (SOFC) which can improve the output of the unit cell of the solid oxide fuel cell, without occurring cost due to an additional process. The unit cell of the solid oxide fuel cell, comprises: a fuel electrode support body; a fuel electrode reaction layer; an electrolyte; and an air electrode, wherein the fuel electrode support body is made from an NiO and YSZ mixed material, the fuel electrode reaction layer is made from a CeScSZ and NiO mixed material, the electrolyte is made from a CeCsSZ material, and wherein the air electrode is made from an LSM and CeScSZ mixed material.

18 Claims, 3 Drawing Sheets

(52) U.S. Cl.
CPC .......... *H01M4/8857* (2013.01); *H01M 4/8875* (2013.01); *H01M 4/8885* (2013.01); *H01M 4/8889* (2013.01); *H01M 4/9025* (2013.01); *H01M 4/9033* (2013.01); *H01M 8/126* (2013.01); *H01M 8/1213* (2013.01); *H01M 8/1226* (2013.01); *H01M 2008/1293* (2013.01); *H01M 2300/0077* (2013.01); *Y02E 60/521* (2013.01); *Y02E 60/525* (2013.01); *Y02P 70/56* (2015.11)

(56) References Cited

FOREIGN PATENT DOCUMENTS

| | | | |
|---|---|---|---|
| JP | H0817450 | A | 1/1996 |
| JP | 2008053107 | A | 3/2008 |
| JP | 201059046 | A | 3/2010 |
| JP | 2010282933 | A | 12/2010 |
| KR | 10-2010-0108957 | | 10/2010 |
| KR | 10-1081168 | | 11/2011 |
| KR | 10-2012-0000337 | | 1/2012 |
| WO | 2009122768 | A1 | 10/2009 |
| WO | 2011162571 | A2 | 12/2011 |

OTHER PUBLICATIONS

Kim, Yeong Mi et al.; "Electromechanical studies of nano-scale solid electrolyte powder prepared by chemical synthesis process"; The Korean Society for New and Renewable Energy, Journal of 2009 Spring Conference, 2009; pp. 295-298.

Korean Intellectual Property Office; International Search Report for PCT/KR2012/009812; Feb. 28, 2013.

Wang, Zhenwei, et al., "Investigation of LSM1.1-SCSZ Composite Cathodes for Anode-Supported Solid Oxide Fuel Cells", Solid State Ionics 176 (2005), pp. 2555-2561.

* cited by examiner

TECHNIQUE FOR DESIGNING AND MANUFACTURING SOLID OXIDE FUEL CELL HAVING IMPROVED OUTPUT CAPABILITY IN MID TO LOW TEMPERATURE

TECHNICAL FIELD

The present invention relates to a method of manufacturing a unit cell of a solid oxide fuel cell (SOFC), and more particularly to material compositions of an electrolyte layer and a cathode, and a process of designing and manufacturing a unit cell for achieving high output of an SOFC unit cell.

BACKGROUND ART

A solid oxide fuel cell (SOFC) operates at a high temperature of about 900 to 1000° C., and thus, exhibits superior electric power generating efficiency in comparison to other fuel cells. However, deterioration of fine structures of an anode, an electrolyte layer, and a cathode forming a unit cell caused by operation at high temperatures, restrictions in application of ceramic materials and an expensive manufacturing process bring about durability, reliability, and economic feasibility problems. As such, delays in practical utilization of SOFCs are prominent. Accordingly, in recent years, research and development is being conducted on reducing the operating temperature of SOFCs to a medium-low temperature of about 700 to 800° C. and in employing inexpensive metallic materials for an interconnector instead of expensive ceramic materials. A conventional SOFC unit cell operating at a high temperature of 900 to 1,000° C. is formed of an anode supporter, an anode reaction layer, an electrolyte and a cathode, wherein the anode supporter includes Nickel(II) oxide-Yttria-stabilized zirconia (NiO—YSZ), the anode reaction layer includes YSZ, and the cathode includes a Lanthanum strontium manganite (LSM) material so as to maintain mechanical properties of the ceramic unit cell.

Conventional SOFC unit cells are required to operate at a high temperature of at least 800° C. with the foregoing structure. Since output characteristics of an SOFC increase in proportion to an operating temperature, raising the operating temperature is favorable for efficient generation of electricity, whereas deterioration of the unit cell by a rise in temperature introduces durability issues and increased costs. Specifically, in an SOFC unit cell manufactured using a YSZ electrolyte material among conventional SOFC materials, substantial changes in an ohmic resistance occur according to the operating temperature. Particularly, a drastically increase occurs at an operating temperature of 800° C. or lower, for example, about 700° C., leading to a dramatic decrease in overall output characteristics of the SOFC unit cell. That is, the SOFC unit cell manufactured by conventional technology may exhibit low output performance, for example, about 0.35 watts/ square centimeter ($W/cm^2$) at an operating temperature of about 750° C.

Accordingly, there is a need to investigate design technology, new materials, and manufacturing processes for an SOFC unit cell which prevents a decrease in power output while maintaining an SOFC operating temperature of 800° C. or lower. That is, to resolve a decrease in output performance due to decreasing the SOFC operation temperature, use of Cerium (Ce) or Scandia Stabilized Zirconia (ScSZ) based solid electrolyte materials having excellent oxygen ion conductivity, instead of a conventional YSZ solid electrolyte, is being actively studied for reducing ohmic resistance by transferring oxygen ions in a unit cell. Also, a Lanthanum strontium cobalt ferrite (LSCF) material having excellent ion conductivity and electron conductivity is being researched for a cathode, instead of a conventional LSM material.

In the conventional technology, when the SOFC operating temperature is reduced to a medium-low temperature, electrochemical reaction properties are relatively deteriorated to increase the ohmic resistance of an electrolyte and electrochemical polarization resistance of a cathode, causing a considerable deterioration in output characteristics of an SOFC unit cell. Accordingly, rigorous studies are being conducted to derive an optimal output using the conventional materials. That is, manufacture of an SOFC unit cell which prevents a voltage drop due to a thinning electrolyte layer of a conventional YSZ material, employs novel solid electrolyte materials with excellent ion conductivity, such as Ce and ScSZ materials, and uses an LSCF material with superior conductivity, and catalytic performance for a cathode are being investigated.

There exists a design for an SOFC unit cell using ScSZ and Gadolinia-doped ceria (GDC)-based solid electrolytes having excellent ion conductivity and an LSCF material with superior electron conductivity. That is, designing and manufacturing an SOFC unit cell which uses conventional Ni—YSZ as an anode supporter, NiO—CeScSZ or NiO—GDC materials as an anode reaction layer, CeScSC or GDC materials as an electrolyte layer, and LSCF—CeScSZ or LSCF—GDC materials as a cathode is being examined. However, an LSCF cathode material reacts with a YSZ or ScSZ electrolyte to cause a dual-phase reaction on an interface between the electrolyte and the cathode, and thus, remarkably reducing output of the SOFC unit cell. Thus, suppression of such a side reaction is necessary to apply the LSCF material as a high-performance cathode material to the unit cell, and accordingly an interface film of a thin-film GDC electrolyte material is additionally needed between the cathode and the electrolyte. However, since the GDC material has poor sinterability and a higher sintering temperature than the ScSZ or YSZ materials, the electrolyte layer provides debased fineness after sintering acting as a new source ohmic resistance, thereby insignificantly improving practical output performance or rather reducing output characteristics according to circumstances and increasing manufacturing costs. Thus, an optimal design and an inexpensive manufacturing process for an SOFC unit cell based on convergence of the conventional technology and new material technology currently being developed is needed. Although manufacture of high-output SOFC unit cells operating at a medium-low temperature of about 750° C. has been recently researched and developed, an SOFC unit cell adopting a GDC buffer layer for controlling reaction between the YSZ electrolyte material and the LSCF cathode material involves a dual-phase reaction and process control problems.

DISCLOSURE OF INVENTION

Technical Goals

The present invention is conceived to solve the aforementioned issues, such as limits in maintaining mechanical properties due to a thinning YSZ electrolyte layer, and thus, is to provide a process of designing and manufacturing a solid oxide fuel cell (SOFC) using materials with excellent electrical conductivity for a solid electrolyte and a cathode.

Technical Solutions

According to an aspect of the present invention, there is provided a unit cell of a solid oxide fuel cell (SOFC) including an anode supporter formed of a mixture of Nickel(II) oxide (NiO) and Yttria-stabilized zirconia (YSZ), an anode reaction layer formed of a mixture of Cerium Scandia Stabilized Zirconia (CeScSZ) and NiO, an electrolyte formed of CeScSZ, and a cathode formed of a mixture of Lanthanum strontium cobalt (LSM) and CeScSZ.

The anode reaction layer, the electrolyte and the cathode include 1Ce10ScSZ powder.

The anode supporter, the anode reaction layer and the electrolyte are manufactured by stacking and cofiring a film manufactured by tape casting. The cathode is manufactured by screen printing. The anode reaction layer is manufactured by mixing a NiO powder and a CeScSZ powder at 46:54% by weight (wt %). Here, the NiO powder may have a size of 0.5 µm, and the CeScSZ powder may have a size of 0.2 to 0.5 micrometers (µm) and a specific surface area of 11 square meters/gram ($m^2/g$). The electrolyte is manufactured by mixing the CeScSZ powder and a solvent at 40:60 wt %. Here, the CeScSZ powder has a size of 0.2 to 0.5 µm and a specific surface area of 11 $m^2/g$. The cathode is manufactured by mixing a LSM powder and a CeScSZ powder at a weight ratio 1:1 (wt %).

According to another aspect of the present invention, there is provided a method of manufacturing a unit cell of an SOFC, the method including preparing an anode supporter slurry by mixing NiO powder and YSZ powder, preparing an anode reaction layer slurry by mixing CeScSZ powder and NiO powder, preparing an electrolyte slurry using CeScSZ powder, manufacturing an anode supporter sheet using the anode supporter slurry by tape casting, manufacturing an anode reaction layer sheet using the anode reaction layer slurry by tape casting, manufacturing an electrolyte sheet using the electrolyte slurry by tape casting, manufacturing an anode supporter-electrolyte assembly by sequentially stacking the anode supporter sheet, the anode reaction layer sheet and the electrolyte sheet, manufacturing an anode supporter-electrolyte by calcining and cofiring the anode supporter-electrolyte assembly, preparing a cathode paste by mixing the LSM powder and the CeScSZ powder, applying the cathode paste to the anode supporter-electrolyte by screen printing, and performing sintering.

The anode reaction layer slurry, the electrolyte slurry, and the cathode paste include 1Ce10ScSZ powder. The anode reaction layer slurry is manufactured by mixing the NiO powder and the CeScSZ powder at 46:54 wt %. Here, the NiO powder has a size of 0.5 µm, and the CeScSZ powder has a size of 0.2 to 0.5 µm and a specific surface area of 11 $m^2/g$. The electrolyte slurry is prepared by mixing the CeScSZ powder and a solvent at 40:60 wt %. Here, the CeScSZ powder has a size of 0.2 to 0.5 µm and a specific surface area of 11 $m^2/g$. The cathode paste is prepared by mixing the LSM powder and the CeScSZ powder at a weight ratio 1:1 (wt %).

The manufacturing of the anode supporter-electrolyte assembly stacks the anode supporter sheet, the anode reaction layer sheet and the electrolyte sheet alternately in a first direction and a second direction perpendicular to the first direction to prevent warping and cracking. The manufacturing of the anode supporter-electrolyte mounts a flat alumina ceramic supporter with a fixed size and weight on the anode supporter-electrolyte assembly and conducts cofiring at 1,350° C. while exerting a force of about 40 kilograms/square centimeter ($kg/cm^2$).

Effects of the Invention

As described above, according to exemplary embodiments of the present invention, CeScSZ as a solid electrolyte material with high ion conductivity and a conventional LSM material as a cathode material are used for a solid oxide fuel cell (SOFC), thereby improving output a unit cell of the SOFC without involving cost due to an additional process.

BEST MODE FOR CARRYING OUT THE INVENTION

Figure 1:
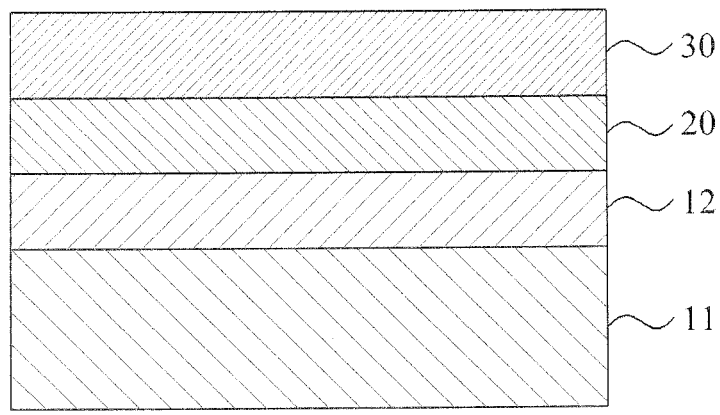
FIG. 1 is a diagram illustrating a structure of a unit cell of a solid oxide fuel cell (SOFC) according to an exemplary embodiment of the present invention.

While exemplary embodiments of the present invention will be described below in detail with reference to the accompanying drawings, the present invention is not limited to the exemplary embodiments. In describing the present invention, detailed descriptions of known functions or configurations may be omitted so as to clarify the substance of the present invention.

Hereinafter, a process of designing and manufacturing a unit cell of a solid oxide fuel cell (SOFC) according to an exemplary embodiment of the present invention will be described in detail with reference to FIGS. 1 to 3.

The unit cell of the SOFC according to the present embodiment includes an anode supporter (NiO—YSZ), an anode reaction layer (NiO—CeScSZ), an electrolyte (CeScSZ) and a cathode (LSM). When lanthanum strontium manganite (LSM) is used for the cathode, no additional processes are involved, output characteristics of the unit cell are improved even when the SOFC operates in a medium-low temperature range of 700 to 800° C., as in use of lanthanum strontium cobalt ferrite (LSCF), and an inexpensive manufacturing process of the unit cell may be maintained.

In detail, a process of manufacturing an SOFC unit cell that designs an SOFC unit cell by combining an LSM material for a cathode and a Scandia Stabilized Zirconia (ScSZ) based electrolyte as a solid electrolyte with high ion conductivity, manufactures an anode supporter-electrolyte assembly by tape casting and manufactures a cathode layer by screen printing is developed, thereby achieving high-output performance of the SOFC unit cell even at medium-low temperatures without involving cost of an additional manufacture process.

The anode reaction layer is manufactured by mixing Nickel(II) oxide (NiO) and

Cerium Scandia Stabilized Zirconia (CeScSZ) materials at a weight ratio of 50:50, forming the mixture into a film by tape casting and adjusting a thickness of the film to about 20 to 30 micrometers (µm). To suppress polarization resistance of hydrogen fuel, a CeScSZ material with a uniform particle size and a uniform shape is used so that the supporter maintains a porosity of about 40 to 60% even after hydrogen reduction of the NiO material. A solid electrolyte layer is manufactured using a CeScSZ material with excellent ion conductivity at a medium-low temperature of 750° C. in the same manner as the anode reaction layer. Then, an anode supporter film, an anode reaction layer film and an electrolyte layer film are stacked and laminated, followed by firing at about 1,350° C. once, thereby simply manufacturing the anode support-electrolyte assembly. A Lanthanum strontium manganite (LSM) cathode slurry is applied directly to the electrolyte layer, without interposing an additional buffer layer film between the electrolyte layer of the anode support-electrolyte assembly and the cathode, and is finally sintered at about 1,100° C., thereby completing manufacture of an SOFC unit cell.

EXAMPLE 1

The present invention employs 1 mol % Ce-doped 10 mol % scandium-stabilized zirconia (1Ce10ScSZ) that has superior oxygen ion conductivity in a medium-low temperature range to YSZ and a similar coefficient of thermal expansion to that of an SOFC electrode material and is relatively resistant to brittleness for manufacturing an SOFC unit cell exhibiting high output capability at a medium-low temperature.

When 1Ce10ScSZ is used as a material for an anode reaction layer, an electrolyte and a cathode in manufacturing the SOFC unit cell, polarization resistance of the SOFC unit cell is remarkably reduced when operating in a medium-low temperature range of 750° C. or lower. Thus, the unit cell may exhibit an excellent output characteristic in a medium-low temperature range of 750° C. by using inexpensive LSM for the cathode, in lieu of more expensive materials for medium-low temperatures, such as Lanthanum strontium cobalt ferrite (LSCF) and Gadolinia-doped ceria GDC.

The following example is provided for a full understanding of the present invention in the art and may be modified or changed variously without limiting the scope of the present invention to the following example. A process of manufacturing the SOFC unit cell is described in detail as follows.

First, an anode supporter was manufactured.

Anode supporter slurry was prepared using NiO and YSZ at 60:40, after which 30 to 40 anode sheets with a thickness of 40 μm were stacked using the anode supporter slurry by tape casting, thereby producing the anode supporter with a thickness of about 1 to 1.2 millimeters (mm).

Next, an anode reaction layer slurry was prepared.

The anode reaction layer slurry was prepared by mixing about 0.5-μm NiO powder and about 0.2 to 0.5-μm CeScSZ powder with a specific surface area of 11 square meters/gram ($m^2/g$). Here, the powder mixture and a solvent were mixed at 46:54% by weight (wt %), and the NiO powder and the CeScSZ powder were mixed at 54:46 wt % so that a ratio of Ni to CeScSZ was 4:6 after reduction. Toluene and ethanol were used at a weight ratio of 20:13 as the solvent for uniformly dispersing the powder mixture, and a dispersant (fish oil) was added, followed by first ball milling at 200 revolutions per minute (rpm) for 24 hours. After 24 hours, an equivalent amount of a binder to a viscosity of 250 CentiPoises (cP) was added, after which second ball milling was conducted for 24 hours, thereby forming a reaction layer film with a thickness of 22 μm by tape casting.

Subsequently, an electrolyte slurry was prepared.

The electrolyte slurry was prepared using 1Ce10ScSZ powder the same as used for the anode reaction layer slurry. The powder and a solvent were mixed at a weight ratio of 40:60 wt %, in which toluene and ethanol were used at 4:1 wt % as the solvent, and an equivalent amount of a hinder to a viscosity of 700 cP and a dispersant were added, thereby producing an electrolyte layer with a thickness of about 10 μm as a thin film in the same manner as used for the anode reaction layer slurry.

Next, cathode paste was prepared.

The cathode paste was prepared by mixing a mixture of LSM [$(La_{0.7}Sr_{0.3})MnO_{3-x}$] cathode powder and the same 1Ce10ScSZ powder with a solvent at a weight ratio of 70:30 wt %, in which the LSM powder and CeScSZ powder were mixed at 1:1 wt %. Here, ethyl cellulose and a-terphenol were used at 94:6 wt % as the solvent. When a cathode is manufactured using the prepared cathode paste by screen printing, the cathode may be of a good quality including an excellent leveling effect without being affected by surface defects of an electrolyte.

Subsequently, a unit cell was manufactured.

The 22-μm cathode reaction layer (Ni/CeScSZ) was disposed on the cathode supporter (Ni/YSZ/CB) with a thickness of about 1 to 1.2 mm, and the CeScSZ electrolyte as a 10-μm thin film was stacked on the cathode reaction layer to manufacture an anode supporter-electrolyte assembly, after which the cathode (LSM/CeScSZ) was applied to the electrolyte. Here, the anode supporter, the anode reaction layer and the electrolyte were manufactured by tape casting, while the cathode was manufactured by screen printing.

In detail, an anode supporter slurry was prepared using Nb and YSZ at 60:40, after which 30 to 40 anode sheets with a thickness of 40 μm were stacked using the anode supporter slurry by tape casting, thereby producing the anode supporter with a thickness of about 1 to 1.2 mm.

Particles in a film manufactured by tape casting are arranged in a casting direction. Thus, when such films are stacked in one direction, a unit cell may warp in a calcination process (of removing organic matter and a pore forming agent). Thus, in the present embodiment, the anode supporter, the anode reaction layer and the electrolyte layer were stacked to cross in two different directions. That is, one anode sheet was disposed in a first direction, and another anode sheet was stacked thereon in a second direction perpendicular to the first direction. In this way, the anode sheets were sequentially stacked to cross in the first and second directions, thereby forming the anode supporter.

Next, as described above, one sheet of the 22-μm Ni-CeScSZ anode reaction layer, obtained by mixing the NiO powder and the CeScSZ powder, and the 10-μm thin-film CeScSZ electrolyte were sequentially stacked to form the anode supporter-electrolyte assembly.

Next, the assembly was laminated by exerting constant force at a constant temperature and subjected to calcination and cofiring. Here, in lamination, a flat alumina ceramic supporter with a fixed size and weight was mounted on the anode supporter-electrolyte assembly, and a force of 450 kilograms/square centimeter ($kg/cm^2$) at 70° C. was exerted for about 20 minutes.

In calcination, temperature was elevated to 1,000° C., maintained for 3 hours, and naturally cooled to room temperature so as to remove the solvents, binders and carbon as a pore forming agent included in the slurries for manufacturing the anode supporter-electrolyte assembly.

Subsequently, a flat alumina ceramic supporter with a fixed size and weight was mounted on the calcinated anode supporter-electrolyte assembly and subjected to cofiring at 1,350° C. while exerting a force of about 40 $kg/cm^2$, thereby manufacturing an anode supporter-electrolyte.

The cathode was applied to a thickness of about 40 μm to the electrolyte of the anode supporter-electrolyte by screen printing and subjected to sintering, thereby producing the unit cell.

The cathode was formed by applying the cathode paste four times by screen printing into a multilayer structure with a thickness of 40 μm and sintering the structure at 1,100° C. for 3 hours.

The SOFC unit cell manufactured according to the present invention was designed as in FIG. 1 and shaped as a coin cell to be evaluated by a fuel cell evaluation system. The fuel cell evaluation system evaluated I-V characteristics and impedance of the coin cell-shaped unit cell as illustrated in FIG. 2. For current-voltage analysis, at each operating temperature, $H_2$ containing 3% water was flowed to the anode at 200 milliliters/minute (ml/min) and oxygen was flowed to the cathode at 300 ml/min. Current-voltage was measured by an electric loader (model: PLZ664WA, KIKUSUI, Japan) using Pt mesh as a current collector for the anode and the cathode.

Alternating current (AC) impedance of the cell was measured in a frequency range from 100 kilohertz (kHz) to 0.02 hertz (Hz) at an open circuit voltage and an amplitude of 10 millivolts (mV) using an impedance analyzer (Frequency response analyzer, Solatron, solatron 1260, U.S.A.).

Figure 2:
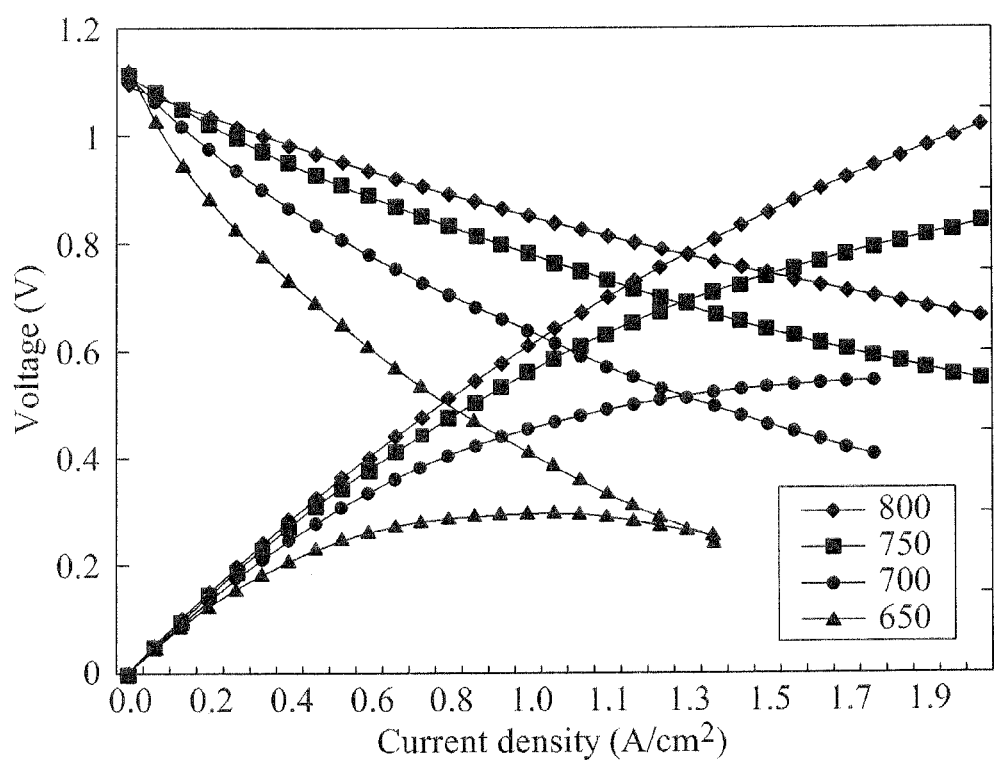
FIG. 2 is a graph illustrating output of the unit cell of the SOFC according to the exemplary embodiment of the present invention.
Figure 3:
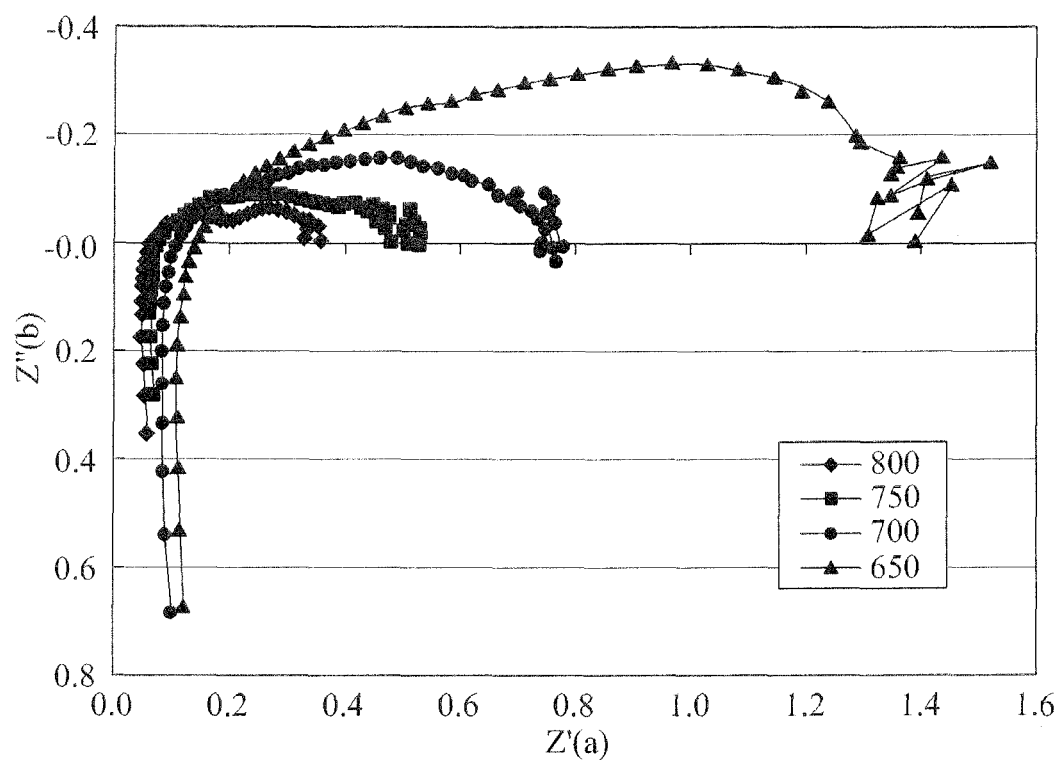
FIG. 3 is a graph illustrating impedance of the unit cell of the SOFC according to the exemplary embodiment of the present invention.

Further, evaluation results of output characteristics of the SOFC unit cell are illustrated in FIG. 2. As shown in FIG. 2, the unit cell has an output of about 1.1 watts/square centimeter ($W/cm^2$) at a current density of 2.0 amperes/square centimeter ($A/cm^2$) when operating at a medium-low temperature of about 750° C. Also, as a result of measuring impedance, the unit cell exhibits an ohmic resistance of about 0.07 ohms-square centimeter ($\Omega cm^2$) and a polarization resistance of 0.45 $\Omega cm^2$ at 750° C., which are excellent output characteristics as compared with a maximum output of about 0.23 $W/cm^2$, an ohmic resistance of 0.4 $\Omega cm^2$ and a polarization resistance of 0.6 $\Omega cm^2$ at the same temperature.

The results show that the unit cell of the present invention exhibits about two to three times better output characteristics than when a conventional YSZ electrolyte is used and output characteristics are about about 10% or more superior to an SOFC unit cell employing a cathode of an LSCF material. Also, the unit cell of the present invention involves a simplified manufacture process and reduced cost as compared with a process using an LSCF cathode material.

In the present invention, since a CeScSZ material is used instead of a YSZ electrolyte, ohmic resistance of the unit cell is considerably reduced. Also, the CeScSZ material does not cause a dual-phase reaction with a cathode material and thus, the SOFC unit cell may have substantially improved performance and exhibit high output characteristics with reliability at a medium-low temperature of 800° C. or lower without involving additional cost due to a manufacture process of the unit cell.

Although the present invention has been described with reference to a few embodiments and the accompanying drawings, such embodiments are provided for ease of understanding and the present invention is not limited to the foregoing embodiments. Instead, it would be appreciated by those skilled in the art that changes may be made to these embodiments without departing from the principles and spirit of the invention, the scope of which is defined by the claims and their equivalents.

What is claimed is:

1. A unit cell of a solid oxide fuel cell comprising:
    an anode supporter formed of a mixture of Nickel(II) oxide (NiO) and Yttria-stabilized zirconia (YSZ);
    an anode reaction layer formed of a mixture of Cerium Scandia Stabilized Zirconia (CeScSZ) and NiO;
    an electrolyte formed of CeScSZ; and
    a cathode formed of a mixture of Lanthanum strontium cobalt (LSM) and CeScSZ.

2. The unit cell of claim 1, wherein the anode reaction layer, the electrolyte, and the cathode comprise 1Ce10ScSZ powder.

3. The unit cell of claim 1, wherein the anode supporter, the anode reaction layer and the electrolyte are manufactured by stacking and cofiring a film manufactured by tape casting.

4. The unit cell of claim 3, wherein the cathode is manufactured by screen printing.

5. The unit cell of claim 3, wherein the anode reaction layer is manufactured by mixing a NiO powder and a CeScSZ powder at 46:54% by weight (wt %).

6. The unit cell of claim 5, wherein the NiO powder has a size of 0.5 micrometers (μm), and the CeScSZ powder has a size of 0.2 to 0.5 um and a specific surface area of 11 square meters/gram ($m^2/g$).

7. The unit cell of claim 3, wherein the electrolyte is manufactured by mixing the CeScSZ powder and a solvent at 40:60 wt %.

8. The unit cell of claim 7, wherein the CeScSZ powder has a size of 0.2 to 0.5 μm and a specific surface area of 11 $m^2/g$.

9. The unit cell of claim 3, wherein the cathode is manufactured by mixing LSM powder and CeScSZ powder at a weight ratio 1:1 (wt %).

10. A method of manufacturing a unit cell of a solid oxide fuel cell, the method comprising:
    preparing an anode supporter slurry by mixing Nickel(II) oxide (NiO) powder and Yttria-stabilized zirconia (YSZ) powder;
    preparing an anode reaction layer slurry by mixing Cerium Scandia Stabilized Zirconia (CeScSZ) powder and NiO powder;
    preparing an electrolyte slurry using CeScSZ powder;
    manufacturing an anode supporter sheet using the anode supporter slurry by tape casting;
    manufacturing an anode reaction layer sheet using the anode reaction layer slurry by tape casting;
    manufacturing an electrolyte sheet using the electrolyte slurry by tape casting;
    manufacturing an anode supporter-electrolyte assembly by sequentially stacking the anode supporter sheet, the anode reaction layer sheet and the electrolyte sheet;
    manufacturing an anode supporter-electrolyte by calcining and cofiring the anode supporter-electrolyte assembly;
    preparing cathode paste by mixing Lanthanum strontium cobalt (LSM) powder and CeScSZ powder;
    applying the cathode paste to the anode supporter-electrolyte by screen printing; and
    performing sintering.

11. The method of claim 10, wherein the anode reaction layer slurry, the electrolyte slurry, and the cathode paste comprise 1Ce10ScSZ powder.

12. The method of claim 11, wherein the anode reaction layer slurry is manufactured by mixing the NiO powder and the CeScSZ powder at 46:54% by weight (wt %).

13. The method of claim 12, wherein the NiO powder has a size of 0.5 μm, and the CeScSZ powder has a size of 0.2 to 0.5 micrometers (μm) and a specific surface area of 11 square meters/gram ($m^2/g$).

14. The method of claim 11, wherein the electrolyte slurry is prepared by mixing the CeScSZ powder and a solvent at 40:60 wt %.

15. The method of claim 14, wherein the CeScSZ, powder has a size of 0.2 to 0.5 μm and a specific surface area of 11 $m^2/g$.

16. The method of claim 11, wherein the cathode paste is prepared by mixing the LSM powder and the CeScSZ powder at a weight ratio 1:1 (wt %).

17. The method of claim 10, wherein the manufacturing of the anode supporter-electrolyte assembly stacks the anode supporter sheet, the anode reaction layer sheet and the electrolyte sheet alternately in a first direction and a second direction perpendicular to the first direction.

18. The method of claim 10, wherein the manufacturing of the anode supporter-electrolyte mounts a flat alumina ceramic supporter with a fixed size and weight on the anode supporter-electrolyte assembly and conducts cofiring at 1,350° C. while exerting a force of about 40 kilograms/square centimeter (kg/cm$^2$).

* * * * *